UNITED STATES PATENT OFFICE.

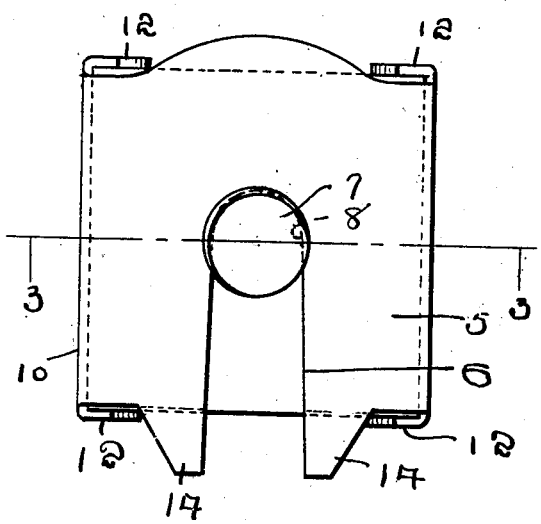
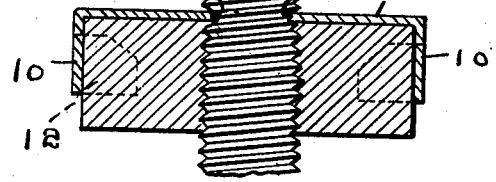
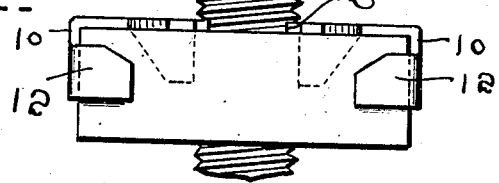
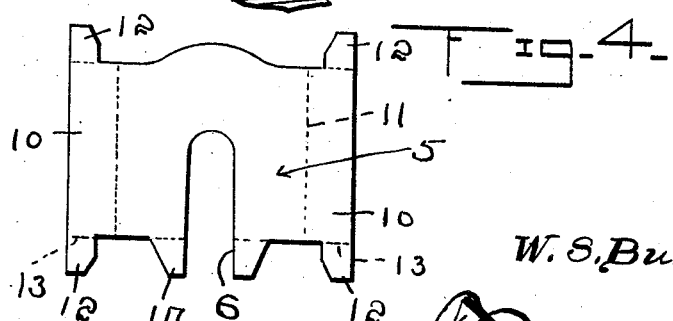

WALTER S. BUNCH, OF KLAMATH FALLS, OREGON.

NUT-LOCK.

1,250,278. Specification of Letters Patent. Patented Dec. 18, 1917.

Application filed November 8, 1916. Serial No. 130,151.

*To all whom it may concern:*

Be it known that I, WALTER S. BUNCH, a citizen of the United States, residing at Klamath Falls, in the county of Klamath, and State of Oregon, have invented certain new and useful Improvements in Nut-Locks; and I do hereby declare the following to be a full, clear, and exact description of the invention, such as will enable others skilled in the art to which it appertains to make and use the same.

This invention has for its object to provide an inexpensive sheet metal nut lock which may be quickly and conveniently applied to a nut and bolt subsequent to the application of the nut to the bolt and which shall effectively lock the nut against removal.

Another object is the provision of a nut lock which will require only a very slight modification of the construction of the bolt in the application of the lock thereto.

With these and other objects in view, the invention consists in the novel construction, combination and arrangement of parts as will be hereinafter specifically described, claimed and illustrated in the accompanying drawing, in which:

Figure 1 represents an end elevation of a nut and bolt, showing the improved nut lock applied to use, Fig. 2 represents a side elevation of the nut and lock, Fig. 3 represents a transverse sectional view on the line 3—3 of Fig. 1, and Fig. 4 represents a plan view of the sheet metal blank from which the nut lock is constructed.

Referring to the drawing in detail, wherein similar reference numerals designate corresponding parts throughout the several views, the numeral 5 indicates generally the substantially rectangular blank of sheet metal from which the nut lock is constructed, which is preferably slightly elongated and is formed with a transverse recess 6, the adjacent edges of which converge inwardly toward the center of the blank.

In applying the nut lock to a nut and bolt the bolt 7 is formed with diametrically opposed recesses 8, which are engaged with the edges of the recess 6 to lock the nut lock against rotation thereon. The body or medial portion of the blank is engaged with the outer surface of the nut 9 and the portions 10 of the blank which project beyond the side faces of the nut are bent over the side faces on the dotted lines 11 of Fig. 4, thereby providing locking flanges preventing rotation of the nut in the lock. The opposite ends of the flanges 10 are formed with reduced extensions 12, which may, if desired, be bent on the dotted lines 13 of Fig. 4, subsequent to the application of the lock to the nut to engage those side faces of the nut lying intermediate the faces engaged by the flanges 10 to further insure against rotary movement of the nut in the lock. The longitudinal edge of the blank in which the recess 6 is formed is provided with reduced extensions 14, which may also be bent against one of the side faces of the nut 9 to further assist in holding the nut. It will be understood that the locking flanges 10 are of such length as to embrace the side faces of the nut to prevent rotation thereof when the body of the nut lock is positioned upon the bolt at a point removed from the nut.

From the foregoing it is evident that I have provided an extremely simple and effective nut lock which may be inexpensively constructed from a relatively small piece of sheet metal and which will effectively lock a nut against rotary movement upon a bolt. It is also evident that the only modification of the construction of the bolt to apply the nut thereto resides in the formation of the recesses 8, which may be conveniently formed with a file or other abrading tool.

What I claim is:

A nut lock including a bolt having diametrically opposed recesses therein, a nut fitted on said bolt, a substantially rectangular piece of sheet metal having a recess in one edge engaged with the recesses in the bolt to secure the piece against rotary movement thereon, the ends of said piece being turned back against two of the opposed side faces of the nut, and reduced extensions carried by the turned back ends and engaging the side faces of the nut intermediate those engaged by the turned back ends.

In testimony whereof I affix my signature in presence of two witnesses.

WALTER S. BUNCH.

Witnesses:
J. A. BROCKENBROUGH,
H. Z. BALLARD.

*Copies of this patent may be obtained for five cents each, by addressing the "Commissioner of Patents, Washington, D. C."*